(12) United States Patent
Huang et al.

(10) Patent No.: US 7,585,145 B2
(45) Date of Patent: Sep. 8, 2009

(54) PANEL TRANSFER APPARATUS

(75) Inventors: Te-Hsin Huang, Padeh (TW); Chao-Huang Wu, Padeh (TW)

(73) Assignee: Chunghwa Picture Tubes, Ltd., Padeh, Taoyuan (TW)

(*) Notice: Subject to any disclaimer, the term of this patent is extended or adjusted under 35 U.S.C. 154(b) by 165 days.

(21) Appl. No.: 11/319,735

(22) Filed: Dec. 29, 2005

(65) Prior Publication Data
US 2007/0154297 A1 Jul. 5, 2007

(51) Int. Cl.
*B65H 3/08* (2006.01)
(52) U.S. Cl. .................. 414/752.1; 294/2
(58) Field of Classification Search ........... 414/752.1, 414/751.1, 749.6; 294/2
See application file for complete search history.

(56) References Cited
U.S. PATENT DOCUMENTS
4,627,785 A * 12/1986 Monforte .................. 414/730
4,971,515 A * 11/1990 Pol et al. .................. 414/797

* cited by examiner

*Primary Examiner*—Donald Underwood
(74) *Attorney, Agent, or Firm*—Venable LLP; Cameron H. Tousi

(57) ABSTRACT

A panel transfer apparatus is provided. The panel transfer apparatus includes a base having a sliding mechanism and a carrier device disposed on the sliding mechanism. The carrier device further includes a plurality of carrier seat, a plurality of sucker sets disposed on the carrier seat, a plurality of sliding rails disposed on the carrier seat, and a plurality of transfer robots disposed on the plurality of sliding rails for placing panels. The panel transfer apparatus provides an. apparatus through which issue of fall-down panels and lowered production yield of the panels, disadvantages of marks and thus uneven brightness left on the panels resulted during panel delivery may be addressed and panels of different sizes may be transported to increase the panel production amount.

8 Claims, 4 Drawing Sheets

PANEL TRANSFER APPARATUS

BACKGROUND OF THE INVENTION

1. Field of the Invention

The present invention relates to a panel transfer apparatus. Particularly, the present invention relates to an automatic panel transfer apparatus for panels of various sizes delivered among a plurality of work stations in manufacturing through which production amount of the panels may be increased, replacement cost of the panel transfer apparatus on production lines may be reduced and production yield of the loaded and moved panels may be assured.

2. Descriptions of the Related Art

In manufacturing of liquid crystal display (LCD) panels, they have to be delivered through a multitude of work stations and assembled therein. Referring to FIG. 1, a schematic diagram is provided which shows a printed circuit board (PCB) is attached to the LCD panel which is continually transferred to other work stations or machines on a production line so that the LCD panel may be subject to a next process. For the current LCD panel manufacturing facility, LCD panels are transferred to various work stations through manual transportation or sucking mechanism, which will be explained below.

In the case of manual transportation, considerable labor work is required since the current and future LCD panels become larger and more weighted although capable of being used for LCD panels of various sizes. Further, LCD panels transported in such manner are susceptible to damage. In this regard, production amount of the LCD panel is limited. Apparently, such transportation manner is not economically practicable, especially for the current large-scaled panels.

In the case of transportation by means of sucking mechanism, some problems are also encountered. Referring to FIG. 2, a conventional sucking mechanism is diagrammatically shown therein. Multiple suckers 4' are disposed at a proper distance from each other on a drive mechanism 3'. The suckers 4' is caused to lower by the drive mechanism 3' and contact the LCD panel 1'. Then, the sucker 4' sucks the surface of LCD panel 1', lifts the LCD panel up and carries the LCD panel 1' to a next station. Although such manner may transport the LCD panel without the need of labor work, the suckers 4' have to contact with the LCD panel 1' and may then carry the LCD panel 1'. The sudden contact brought by this lowering operation may have a chance to cause the LCD panel to break and production yield of the LCD panel is thus adversely affected.

Further, the PCB 2' disposed at the peripheral of the LCD panel 1' may tend to droop when the LCD panel 1' is carried by the suckers 4'. When the LCD panel 1' is landed, the PCB 2' may not be placed smoothly. In addition, when different-sized LCD panels are intended to be transported, the distance between two neighboring suckers 4' has to be adjusted, which seems too time consuming. Worse yet, when the distance between two sucks 4' may not be further adjusted according to an employed LCD panel, the overall sucking mechanism should be replaced. Accordingly, such transportation manner may not promote production yield of the LCD panel and even not satisfy the demand of different-sized LCD panels, which causes an inconvenient use and increases replacement cost. To achieve the object, the present invention provides a panel transfer apparatus. The panel transfer apparatus includes a base and a carrier seat disposed on said base. The carrier seat further includes a plurality of sucker sets disposed on the carrier seat, a plurality of sliding rails disposed on the carrier seat, and a plurality of transfer robots disposed on the plurality of sliding rails for placing panels.

SUMMARY OF THE INVENTION

It is an object of the present invention is to provide a panel transfer apparatus through which issue of fall-down panels and lowered production yield of the panels, disadvantages of marks and thus uneven brightness left on the panels resulted during panel delivery may be addressed and panels of different sizes may be transported to increase the panel production amount.

To achieve the above objects, the panel transfer apparatus according to the present invention comprises a base and a carrier device. The base includes a sliding mechanism and the carrier device is disposed thereon. The carrier device further comprises a plurality of carrier seats, a plurality of sucker sets, a plurality of sliding rails, and a plurality of transfer robots, wherein the plurality of sucker sets and the sliding rails are disposed on the carrier seats and the transfer robots are disposed on the sliding rails for placing panels.

By implementing of present invention, the disadvantages of marks and uneven brightness left on the panels resulted during panel delivery may be solved.

The above and other objects, features and technical contents will become apparent after the detailed description of the present invention is given through the preferred embodiments taken in conjunction with the accompanying drawings.

BRIEF DESCRIPTION OF THE DRAWINGS

The invention will become more fully understood from the detailed description given hereinbelow for illustration only, and thus are not limitative of the present invention, and wherein.

DETAILED DESCRIPTION OF THE INVENTION

The present invention will be described in structure and implementation through the preferred embodiments in connection with the appended drawings.

Figure 1:
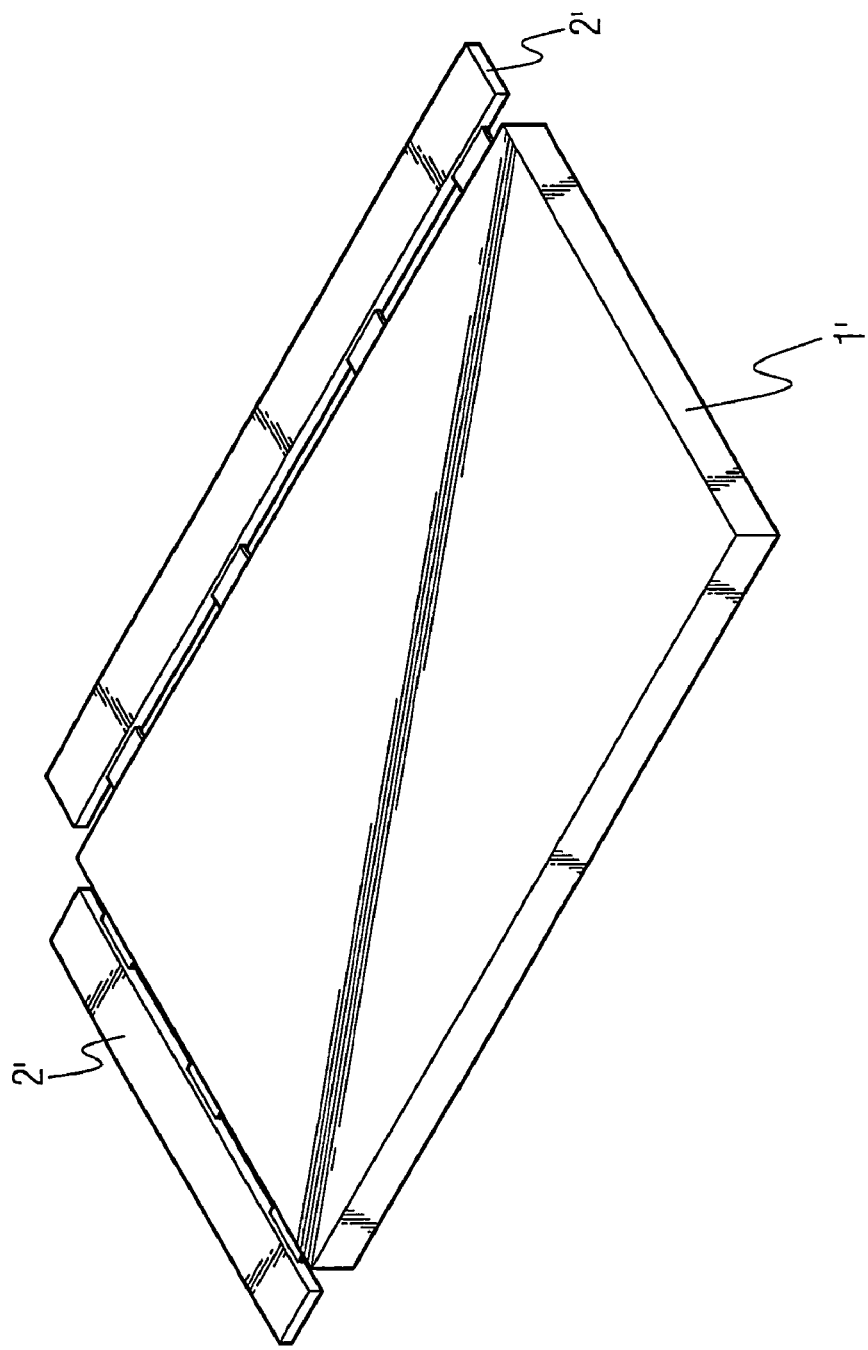
FIG. 1 is a schematic diagram showing a panel is attached to a printed circuit board (PCB)
Figure 2:
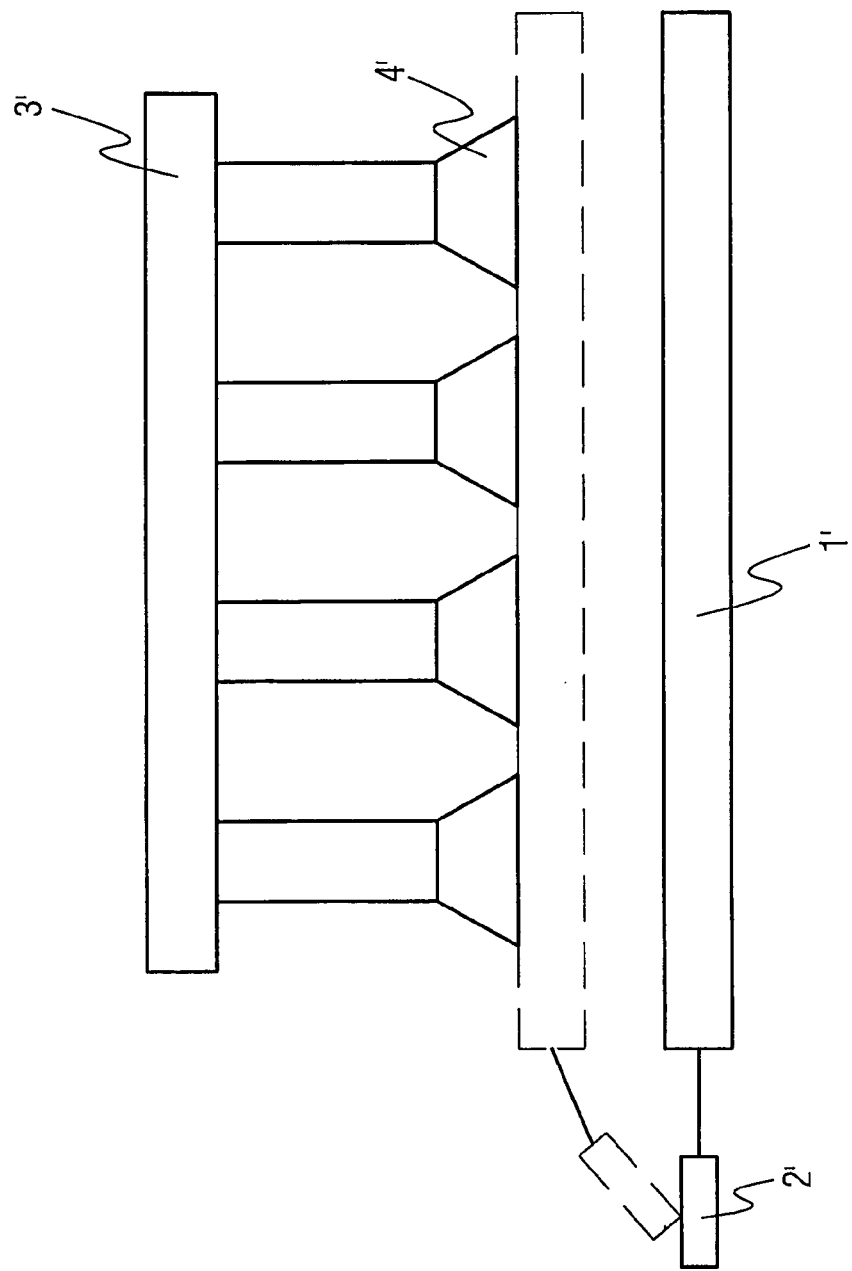
FIG. 2 is a schematic diagram showing a conventional sucking mechanism.
Figure 3:
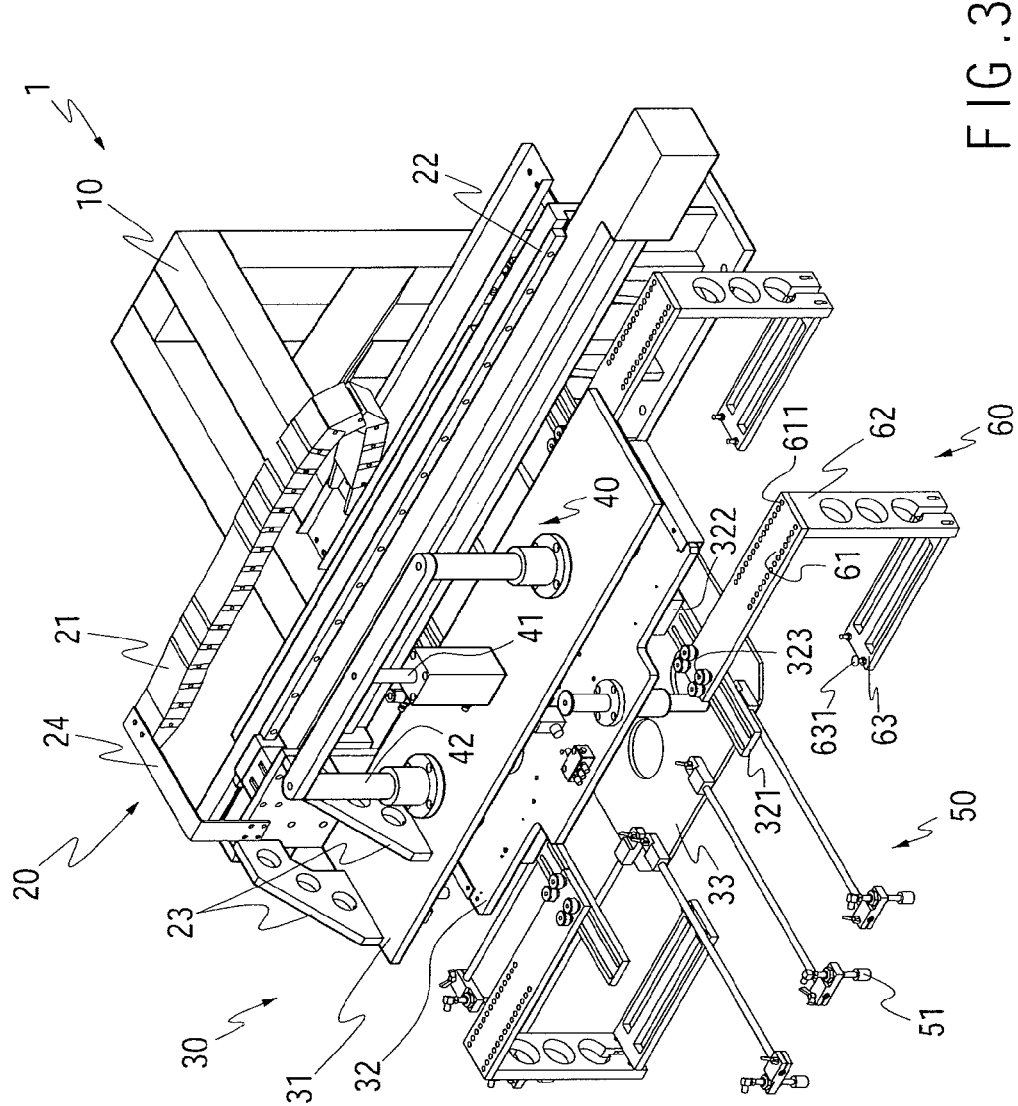
FIG. 3 is a perspective view of a panel transfer apparatus according to the present invention.
Figure 4:
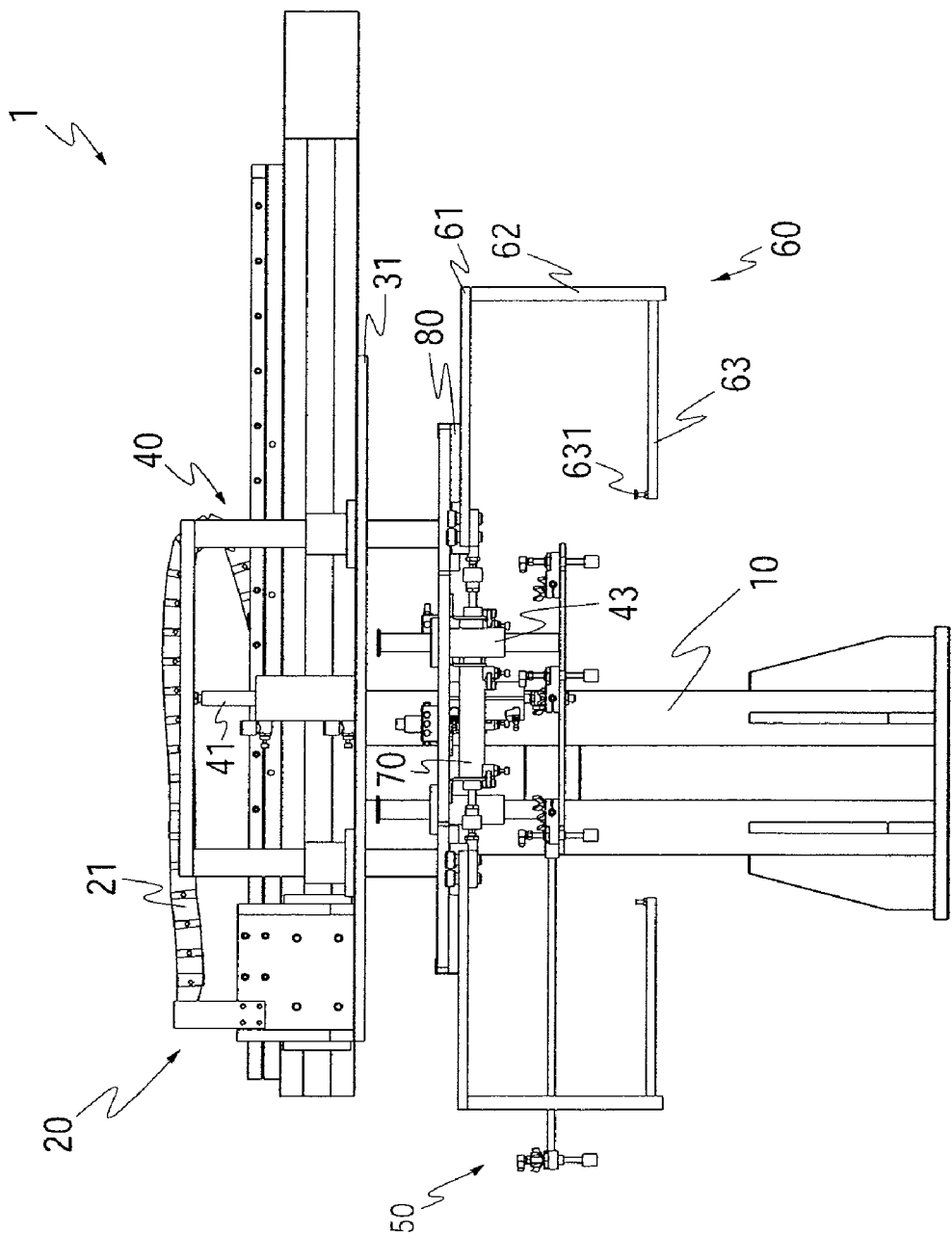
FIG. 4 is a front view of the panel transfer apparatus according to the present invention.

Referring to FIG. 3 and FIG. 4, a perspective view of a panel transfer apparatus and a front view of the panel transfer apparatus are shown. The panel transfer apparatus 1 includes a base 10 and a carrier device. The base 10 includes a sliding mechanism 20. The carrier device is disposed on the sliding mechanism 20, and the carrier device further comprises a carrier seat 30, a lifting mechanism 40, a plurality of suck sets 50, a plurality of transfer robots 60, and an air cylinder 70.

The sliding mechanism 20 may includes a flexible chain 21, a sliding rail 22 and a plurality of fixation member 23, 24. The carrier seat 30 further includes a first carrier seat 31, a second carrier seat 32, and a third carrier seat 33. The lifting mechanism 40 consists of an air cylinder 41 and two lifting poles 42. The plurality of suck sets 50 is disposed on the carrier seat 30. The front part of the sucker sets 50 is an elastic sucker 51. The transfer robots 60 each consists of a first arm 61, a second arm 62 and a transfer seat 63. The first arm 61 has a plurality of holes 611 at a surface thereof. The transfer seat 63 is disposed with at least a sucker 631. The air cylinder 70 is disposed at a lower surface of the second carrier seat 32.

Hereinbelow, the description will be made with respect to implementation of the panel transfer apparatus according to the present invention.

Referring again to FIG. 3 and FIG. 4, the carrier seat 30 of the base 10 of the panel transfer apparatus 1 is disposed and connected on the base 10 by means of a plurality of fixation members 23, 24 of the sliding mechanism 20. Namely, the carrier seat 30 is secured on the base 10 through the sliding mechanism 20. Specifically, the carrier seat 30 slides on the sliding rails 22 through the flexible chain 21 of the sliding mechanism 20 so as to move laterally with respect to the base 10. Further, the first carrier seat 31 of the carrier seat 30 connects and fixes the second carrier seat 32 through the lifting poles 42 of the lifting mechanism 40. Similarly, the second carrier seat 32 connects and fixes the third carrier seat 33 through the lifting poles 43. When the air cylinder 41 of the lifting mechanism 40 is activated, the second carrier seat 32, and the third carrier seat 33 of the carrier seat 30 are lifted and moved up and down with respect to the base 10, i.e. the second carrier seat 32 and the third carrier seat 33 are movable with respect to the first carrier seat 31 while the air cylinder 41 is activated. The plurality of sucker sets 50 is disposed on the third carrier 33 and each includes a sucker 51. The plurality of sliding rails 321 is fixed on a lower surface of the second carrier seat 32. The plurality of transfer robots 60 is fixed on the sliding rails 321 through a sliding body 322 disposed on each of the sliding rails 321.

In the transfer robots 60, the first arm 61 is connected orthogonally to the second arm 62. The transfer seat 63 is also connected orthogonally to the second arm 62. On the transfer seat 63, at least a sucker 631 is disposed. In addition, Referring to FIG. 4, the air cylinder 70 is disposed perpendicular to the sliding bodies 322 on the sliding rails 321. When the air cylinder 70 pushes the sliding rails 321 and the sliding bodies 322 to move laterally with respect to the base 10, the transfer robots 60 are caused to also move to left and right with respect to the base 10 i.e. the sliding rails 321 and the sliding bodies 322 are movable along the sliding rails 80 while the sliding rails 321 and the sliding bodies 322 are pushed by the air cylinder 70.

Referring to FIGS. 3 and 4, a beginning stage of a panel deliver task performed by the panel transfer apparatus 1 is shown. The air cylinder 70 moves the sliding bodies 322 on the sliding rails 321 and thus the transfer robots 60. At this time, the transfer robots 60 stretch and extend towards two sides of the base 10. Before actual panel transportation is conducted, positions of the plurality of holes 611 on the second arm 62 in relation to the first arm 61 should be adjusted and fixed by according to size of the to-be-transported panel. In doing this, an arm distance of the second arm set 62 is adjusted correspondingly. Next, the transfer seat 63 of the transfer robots 60 extends across to below the panel. When the transfer seat 63 of the transfer robots 60 operates, the panel is scooped and held on the transfer seat 63. Further, on the transfer seat 63 is disposed at least a sucker 631.

During the panel transportation, the suckers 631 suck the panel so that the panel may be at a stable state. When it is desired to deliver the panel downstream, the sliding mechanism 20 moves laterally on the sliding rails 22 so that the panel is delivered to the next work station. If lowering or lifting of the panel is required during the panel delivery to the next work station, the carrier seat 30 is caused to move up and down when the air cylinder 41 of the lifting mechanism 40 operates so as to move the panel to a work station of a different altitude.

In the case where a printed circuit board (PCB) is attached at the periphery of the panel, the plurality of sucker sets 50 suck the PCB concurrently. At this time, the panel is delivered to the next work station by the plurality of transfer robots 60, and the carrier seat 30 and the plurality of transfer robots 60 are moved by the lifting mechanism 40 and the air cylinder 70, just as those described above for a transported panel without a PCB attached. Consequently, the PCB attached at the periphery of the panel may not droop during transported and just before placed down on the next work station.

It is to be noted that the sucker 51 of the sucker sets 50 provide elastic forces so that they may not produce a stress on the PCB. In addition, the panel transfer apparatus may service for kinds of panel, such as TFT LCD, STN LCD, PDP, OLED and PLCD panels.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims and their equivalents.

What is claimed is:

1. A panel transfer apparatus for carrying a panel of which periphery a circuit board is connected to, comprising:
    a base, having a sliding mechanism; and
    a carrier device, disposed on said sliding mechanism, further comprising:
        a carrier seat, wherein said carrier seat includes a first carrier seat, a second carrier seat, and a third carrier seat and said first carrier seat connects to and fixes said second carrier seat by a lifting system and said second carrier seat connects to and fixes said third carrier seat through lifting poles;
        a plurality of first suckers disposed on said third carrier seat;
        a plurality of sliding rails disposed on said second carrier seat; and
        a plurality of transfer robots disposed on said plurality of sliding rails, each transfer robot comprising a second sucker, the panel and the circuit board disposed between the first suckers and the second suckers, the panel sucked by first suckers and the circuit board sucked by second suckers.

2. The panel transfer apparatus as claimed in claim 1, wherein said carrier seats are connected and fixed to said base through the a sliding mechanism and slide laterally in relation to said base.

3. The panel transfer apparatus as claimed in claims 1, wherein said second carrier seat and said third carrier seat move up and down in relation to said first carrier seat by said lifting system.

4. The panel transfer apparatus as claimed in claim 1, wherein said second carrier seat further comprises an air cylinder disposed at a lower surface thereof and perpendicular to said sliding rails wherein said air cylinder pushes said sliding rails and said transfer robots to move laterally in relation to said second carrier seat.

5. The panel transfer apparatus as claimed in claim 1, wherein each said transfer robots includes a first arm, a second arm, and a transfer seat, the first arm is in parallel with the transfer seat, the second arm connects the first arm to the transfer seat and the second suckers are on the transfer seats.

6. The panel transfer apparatus as claimed in claim 5, wherein said first arm has a plurality of holes at the surface of two sides thereof and said second arm can be adjusted a distance by a hole pitch of said holes.

7. The panel transfer apparatus as claimed in claim 1, wherein said sliding rails are disposed on a lower surface of said second carrier seat and a sliding body is mounted along said sliding rails.

8. The panel transfer apparatus as claimed in claim 5, wherein said second arm is mounted at ends of said first arm and said transfer seat to form a U-shape.

* * * * *

UNITED STATES PATENT AND TRADEMARK OFFICE
CERTIFICATE OF CORRECTION

PATENT NO. : 7,585,145 B2 Page 1 of 1
APPLICATION NO. : 11/319735
DATED : September 8, 2009
INVENTOR(S) : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 418 days.

Signed and Sealed this

Fourteenth Day of September, 2010

David J. Kappos
*Director of the United States Patent and Trademark Office*